April 21, 1925.
R. A. J. PLANTUREUX
1,534,410
CONVERTIBLE VEHICLE BODY
Filed June 18, 1923　　2 Sheets-Sheet 2
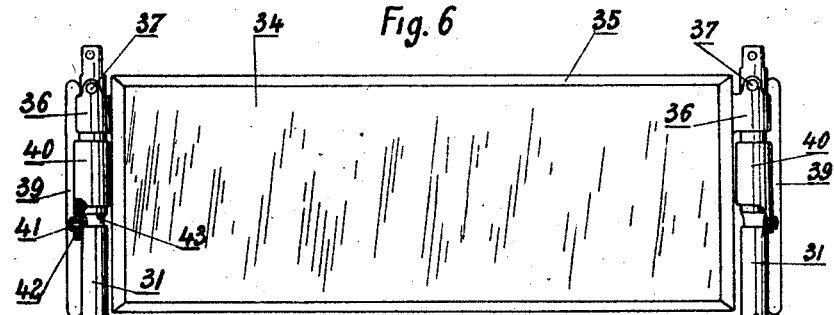
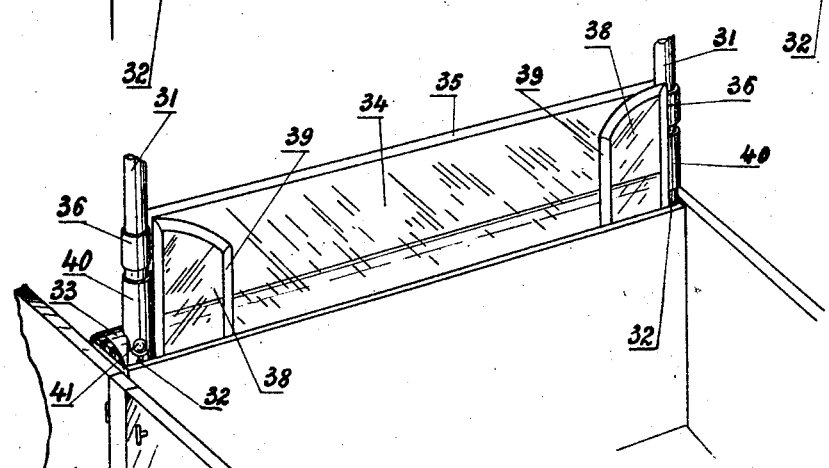
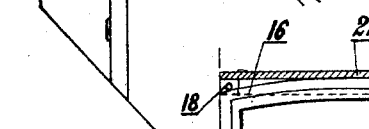
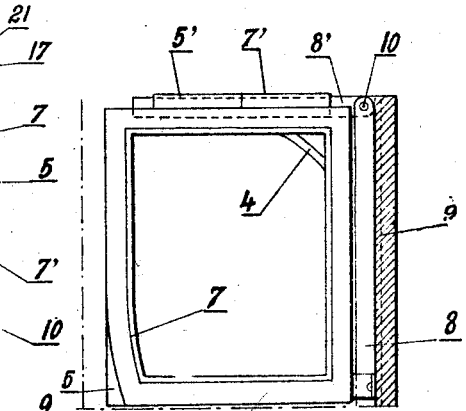

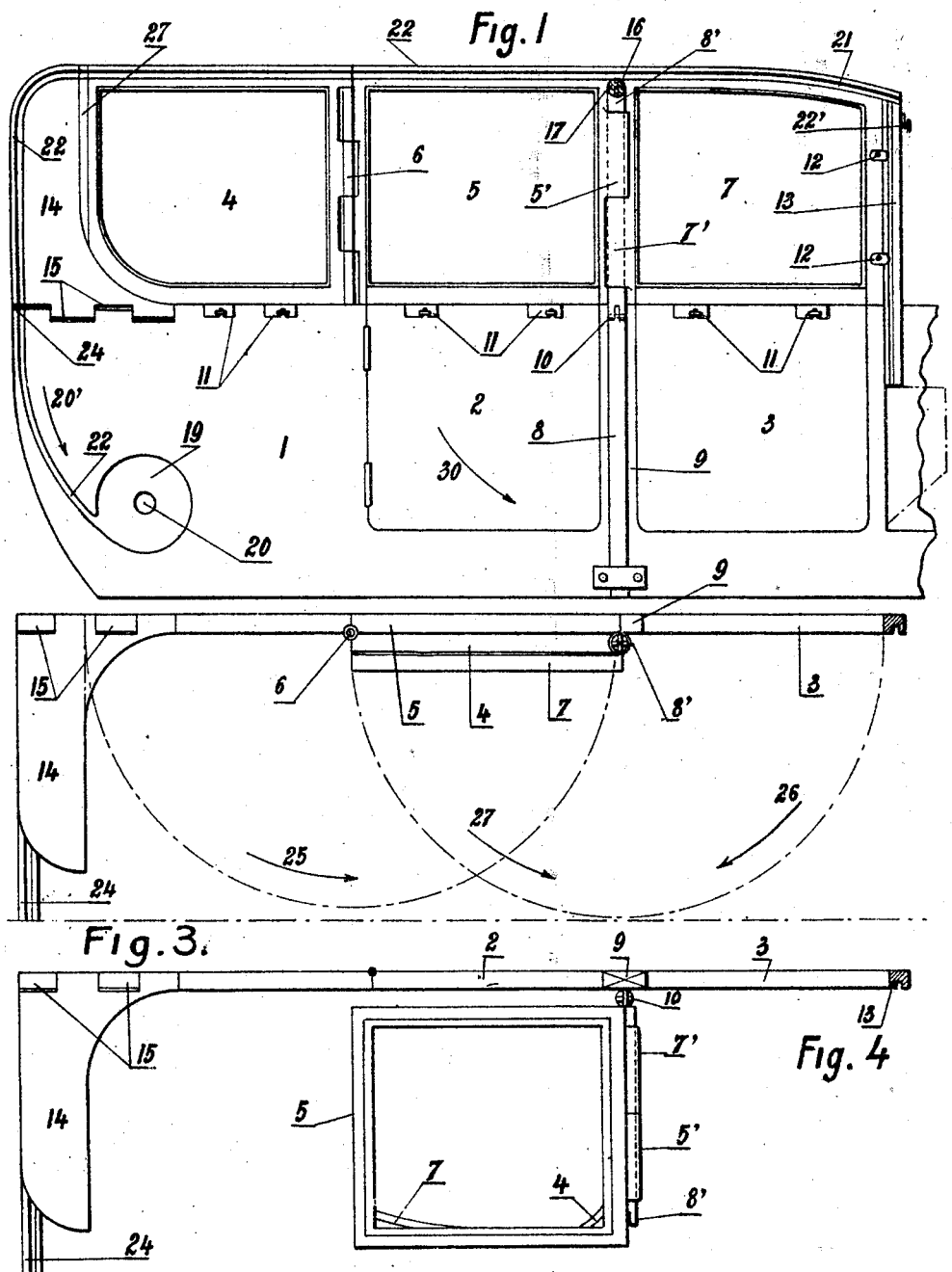

Patented Apr. 21, 1925.

1,534,410

UNITED STATES PATENT OFFICE.

RAYMOND ANDRÉ JACQUES PLANTUREUX, OF PARIS, FRANCE.

CONVERTIBLE VEHICLE BODY.

Application filed June 18, 1923. Serial No. 646,268.

*To all whom it may concern:*

Be it known that I, RAYMOND ANDRÉ JACQUES PLANTUREUX, a citizen of the French Republic, residing at Paris, France, have invented certain new and useful Improvements in Convertible Vehicle Bodies, of which the following is a specification.

My invention relates to improvements in vehicle bodies, and chiefly applicable to motor vehicles, whereby a vehicle may be given the form of an open torpedo, a coupé, or a vehicle with inside drive. By these improvements, the forward and lateral disappearing parts of the vehicle body can be folded behind the driver's seat, and preferably within the back of the seat, and when the said parts are extended they can be secured to uprights jointed upon a hinge and disposed rearwardly of the driver's seat.

To give the vehicle the form of a torpedo, the disappearing parts consist of a rear wind-shield composed of a rigid central panel cross-connecting the two hinged vertical supports, and the said panel can be completed by two lateral movable panels folding upon the central panel when in the disappearing position.

When the vehicle is to be used as a coupé, or as a vehicle with inside drive, the disappearing parts comprise two like groups forming lateral walls and composed of elements hinged together and pertaining respectively to one of the vertical jointed supports, whereby the same may be unfolded so as to serve as an extension of the lateral walls of the vehicle body upon the top of which they are supported, or may be folded down into a closed position; the front panels, by reason of their pivoting movement upon the said hinged vertical support, may be disposed in line with the doors affording access to the driver's seat, in order to form a vehicle body with inside drive, or in line with the back of the driver's seat in order to form a coupé. The rear end and the top of the vehicle body are constructed by the use of a flexible waterproof band which is wound upon a drum of the automatic elastic reaction type disposed below the rear seat of the vehicle.

The appended drawings which are given by way of example set forth an embodiment of the said invention.

Fig. 1 is a diagrammatic view of one side of the said improved vehicle body, disposed for inside drive.

Fig. 2 is a partial end elevation showing the arrangement of the parts in order to form a coupé.

Fig. 3 is a half plan view showing the first stage of folding the vehicle body.

Fig. 4 is a like view showing the last stage.

Fig. 5 is a partial end elevation showing the elements of the vehicle body which are made to disappear behind the back of the driver's seat.

Figs. 6 and 7 show the rear wind-shield which can be used when the vehicle has the form of an open torpedo, Fig. 6 being an elevational view of the wind-shield in position and Fig. 7 a perspective view of the rear of the said wind-shield which is partially made to disappear in the rear of the driver's seat.

In the present example, the permanent side parts of the vehicle body comprise a rear door 2 and the forward door 3 giving access to the driver's seat. The disappearing part of the vehicle body consists of two groups analogous to the one is shown in Fig. 1 as completely extended. The rear frames or panels 4 and 5 are pivoted at 6, and the frames 5 and 7 are both pivoted to the vertical support 8 situated on the axis of the doorpost 9. The support 8 is interrupted by the hinged joint 10 so as to possess a lower fixed part extending along the door and an upper part 8' adapted to fold down upon the joint 10 towards the interior of the vehicle and in a plane perpendicular to the back of the driver's seat. The joints 5' 7' of the frames 5, 7 upon the support 8 are constituted by sockets which are separately slidable along the said support, and the dimensions of the frames 5, 7 correspond respectively to those of the doors 2, 3, said frames being provided with fixed window frames and a hinged glass pane as well as with the fastening means 11 of suitable type securing the same to the doors 2, 3 and thus opening or closing together with the latter.

When the vehicle is arranged for inside driving, the frames or panels 4, 5, 7 are so disposed, Fig. 1, as to bear upon the arm of the seat or the doors; the rear frame 4 is held laterally by fastening means 11 as indicated for 5 and 7. The front panel 7 can be fastened at 12 to the upright of the wind-shield 13, and in general it is obvious that suitable connecting or fastening elements can be provided between the disappearing part and the permanent part of the vehicle body at all desired points in order to obviate jarring of the panels and the resulting noise.

The rear frame 4 is attached to a solid part 14 hinged at 15 to the permanent wall 1, and the part 14 can be brought down horizontally so as to form the rear arms or elbow-rests of the seat in combination with the corresponding part pertaining to the opposite side of the vehicle body.

The two lateral portions of the disappearing part of the vehicle body are cross connected by the bars 16 which are pivoted at 17 to the end of the uprights 8' and are connected at a point 18 situated in the middle vertical plane of the vehicle; the said bars 16 can be readily uncoupled and separated respectively from the uprights 8', using for this purpose any of the known connections by keys or pins removable by hand.

The rear end and the top of the vehicle body are constructed as follows:

A flexible band 22 of waterproof substance is wound on a drum 19 journaled at each end at 20 in the permanent walls 1 of the vehicle body, the drum being of the elastic reaction type so that the said flexible element shall be constantly urged in the direction of the arrow 20', Fig. 1; the said element is stiffened transversely by metallic rods or wood strips secured thereto, and the ends of said rods or strips are movable in the slots 21. The forward end of the said flexible element is attached for instance at 22' to the uprights of the wind-shield, and the said element is given the proper tension by the elastic reaction of the drum 19. The slots 21 in the various members of the vehicle body may communicate with drain outlets suitably spaced apart for the offtake of water to the outside of the vehicle body whereby all infiltration to the inside will be avoided.

For large-sized vehicles and chiefly of the large touring type or excursion car, it may prove somewhat difficult to draw out the flexible element, and it is advisable in this event to employ belts or cables attached to the front of the same and wound upon drums situated at the front of the vehicle, operated by a handle within reach of the driver.

Should it be desired to convert the vehicle into a coupé, starting with the inside drive arrangement, it is simply necessary to bring the said flexible element to the rear of the cross-pieces 16 and to fold back the frames 7 perpendicular to the plane of Fig. 1, as shown in Fig. 2. The hinge 7' slidable on the upright 8' will allow the frame 7 to be brought upon the top edge of the back of the driver's seat while releasing the said flexible element so that the latter can be attached to the uprights of the wind-shield or can be held in any suitable manner in front of the cross-pieces 16. The frames 7 which come together at their edges at the middle of the vehicle, 23, Fig. 2, are connected together in an adequate manner.

To convert the vehicle into an open torpedo, the movable elements of the vehicle body are caused to disappear in the following order:

1. The said flexible element is disconnected, and it is automatically wound upon the drum until its front edge comes into position at 24.

2. The panels 4 are disconnected from the solid parts 14 and the latter are brought down upon their hinges 15 so as to form the rear elbow-rests, as shown in the half plane views, Figs. 3 and 4.

3. The cross-pieces 16 are uncoupled and are removed from the supports 8'; said cross-pieces can be stowed in any suitable place, for instance under the rear seat.

4. The frame 4 is folded upon the inner side of the frame 5, and then the frame 7 is folded upon 4, these operations being respectively indicated by the arrows 25, 26, Fig. 3. A suitable shape is given to said panels, as above stated, whereby they may be properly superposed, and the rear edge of the frame 4 may be cut out on the inner side so as to fit upon the upright 8'.

When these different operations have been performed, the said elements can be made to disappear in various manners. For instance the whole combination of the three superposed frames can be pivoted on the vertical axis 8' in the direction of the arrow 27, Fig. 3, so that it will be parallel with the back of the driver's seat, Fig. 2. The said combination can be caused to slide in the direction of the arrow 28, Fig. 2, so that the whole will disappear and will be contained in a recess parallel with the back of the driver's seat and in the rear of the driver; this vertical motion can be carried out by means of the said hinges 5' 7'.

The combination formed by the three superposed frames can be also folded upon the pivoting axis 10 of the parts 8 and 8' of the said vertical support, operating according to the arrow 29, Fig. 2, and the whole will occupy a horizontal position, Fig. 4. Further, the part 8' of the support remaining horizontal, the said combination is turned about the support according to the arrow 30, Fig. 1 and it comes into position against the back of the driver's seat, Fig. 5.

Other methods of folding the combination 4, 5, 7 might be considered.

It is observed that the whole of the movable part of the vehicle body will thus be made to disappear, and that the elbow rests will be entirely withdrawn, so that the vehicle will have the outline of a torpedo vehicle body. Obviously, should recourse be had to a second disappearing method, the arrangement might comprise a leather or like flap disposed back of the driver's seat so as to cover the two lateral folded groups, so that the inside of the vehicle will not differ appreciably from the known types. A cross-member can be further provided in order to connect the said flap, or the rear stationary wall serving a like purpose (should the first-mentioned disappearing method be adopted) to the back of the said seat, and to extend the upper face of said seat back while at the same time allowing the vehicle to maintain all its outlines without any unsightly projections upon the profile. Further, the flexible element 22 can be unfolded to form a cover piece for protecting the interior against dust when the vehicle is garaged.

On the other hand, in the torpedo arrangement wherein the first method of folding is employed, one can raise the portions 8' of the supports and cross-connect them by the bars 16, and make use of the bridge piece thus formed in order to support the flexible element 22 which will now constitute a hood in the known manner.

Figs. 6 and 7 illustrate a rear wind-shield mounted upon the vehicle when used as a torpedo.

The uprights 31 which are hinged at 32 so as to be brought into the horizontal position and perpendicular to the centre line of the vehicle are mounted back of the driver's seat 33 and adjacent the uprights forming the doorposts. The central panel 34 of the wind-shield is held in a rigid frame 35 having at each side a sleeve 36 which is slidable on the upright 31; the said sleeve 36 can be secured at any suitable height upon the uprights by adequate means, for example by a spring bolt 37 engaging a recess in the upright.

The lateral panels 38 are contained in rigid frames 39 whereof each is provided with a sleeve 40 slidable on the upright 31 independently of the central panel 34. The said panels are so disposed as to be secured to the uprights at the desired height and to rotate thereupon in order to assume all positions, and for this purpose each sleeve 40 may be provided with a spring bolt comprising the spring 42 and engaging a circular slot 43 in the upright 31, Fig. 6. Obviously the side panels instead of being independent may be secured to the frame 35.

The operation of the said device is as follows:

When the wind-shield is mounted in position, Fig. 6, the frame 35 of the central panel will be sufficient to cross connect the two uprights 31 which cannot be folded down; the lateral panels may be turned about as desired, the end of the bolt 41 being displaced in the recess 43. For the disappearing of the said windshield, one first brings down the two lateral panels 38 along the central panel and then releases the spring bolts 41 and slides the sleeves 40 along the uprights 31 until the panels 38 have been made to disappear within the seat back 33, Fig. 7. The spring bolts 37 are then released and the sleeves 36 are made to slide until the central panel 34 is brought entirely within the seat back, and lastly, the upper part of the uprights 31 is brought down upon the hinges 32.

To mount the said wind-shield in position, the said operations are performed in the contrary sequence.

The vertical uprights 31 may be the same as the uprights 8, 8', and in this case the vehicle will carry only the rear wind-shield or the frame combination 5, 6, 7, or the said uprights may be distinct from the uprights and adjacent thereto.

Further, when the rear wind-shield is in position, it is feasible to employ the flexible element 22 as a hood of the known type, and herein the rigid frame 35 replaces the bars 16 in order to support the said element.

What I claim is:

1. In a convertible vehicle body suitable for motor vehicles, a rear frame, permanent side walls on each side of the vehicle and supporting the frame, two upright solid removably attached members in the rear frame and forming the rear thereof on each side of the vehicle, and means hinging the solid members to the top of the permanent side walls and permitting the solid members to be brought down horizontally to form the rear arm and elbow rests of the rear seat.

2. In a convertible vehicle body suitable for motor vehicles, the combination, with a vehicle body having lateral sides, a rear seat, and a forwardly situated disappearing portion comprising two like groups of folding elements forming lateral walls, of a plurality of solid elements pivoted to the rear portion of the lateral sides of the vehicle body and arranged to be lowered horizontally whereby to form the arms and elbow-rests of the rear seat, and to be raised vertically, for attachment to the rear part of the lateral walls, a drum of the automatic flexible reaction type disposed below the rear seat, and a flexible waterproof sheet wound upon the drum and arranged for unwinding and attaching to the rear and upper parts of the solid elements, and to the upper parts of the elements of the said groups.

In witness whereof I have hereunto set my hand.

RAYMOND ANDRÉ JACQUES PLANTUREUX.